United States Patent Office 3,433,766
Patented Mar. 18, 1969

3,433,766
DERIVATIVES OF BISPHENOLIC SUBSTITUTED CARBOXYLIC ACIDS
Reynold E. Holmen, White Bear Lake, Minn., assignor to Minnesota Mining & Manufacturing Company, St. Paul, Minn., a corporation of Delaware
No Drawing. Original application Apr. 20, 1955, Ser. No. 502,742. Divided and this application Sept. 8, 1967, Ser. No. 666,460
U.S. Cl. 260—47           9 Claims
Int. Cl. C08g 17/02, 5/16, 20/00

ABSTRACT OF THE DISCLOSURE

Polyesters, polyamides and amide-esters of bisphenolic acids, such as gamma,gamma-bis(4-hydroxyphenyl)valeric acid useful as chemical intermediates by virtue of their many reactive sites. For example, they may be cross-linked through their plurality of phenolic groups to an insoluble, infusible state.

---

This application is a division of applicant's copending application Ser. No. 502,742, filed Apr. 20, 1955, now U.S. Patent No. 3,382,252. A division of said application has issued as U.S. Patent No. 2,984,685.

This invention relates to a new and highly useful class of bisphenol (bisphenolic) compounds containing phenolic radicals and additional functional groups providing for increased reactivity and other valuable properties. The invention also relates to novel resinous and other products prepared from such compounds. A specific compound from which may of the compounds of the present invention may be derived is gamma,gamma-bis(4-hydroxyphenyl)valeric acid. That particular compound is the central feature of Bader U.S. Patent No. 2,933,520 and is there sometimes designated 4,4-bis(4-hydroxyphenyl)pentanoic acid.

In general, the compositions of the present invention are polyamide, polyester and amide-ester reaction products of exclusively (1) polyethylenimine or a saturated aliphatic compound selected from the group consisting of polyols and alkanolamines having at least two functional groups selected only from amino and hydroxyl groups, and (2) bisphenolic acid of the formula

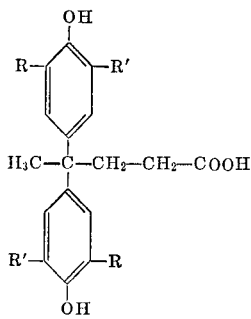

wherein R and R' are each selected from the group consisting of hydrogen and lower alkyl radicals. Included among the polyester reaction products of the invention is a carboxylic ester of a polyalkanol having the general formula

wherein Z is the 4,4-bis(4-hydroxyphenyl)pentanoic acid radical, X and Y are members independently selected from the group consisting of hydroxyl and the 4,4-bis(4-hydroxyphenyl)pentanoic acid radical, R is a saturated aliphatic hydrocarbon radical and $n$ is an integer of from 0 to 1.

Gamma,gamma-bis(4-hydroxyphenyl)valeric acid and analogous bisphenolic compounds are readily produced by reaction, in the presence of a mineral acid catalyst, between (1) a phenol and (2) an oxocarboxylic or keto acid or ester in which a keto group is connected to a carboxy or carboalkoxy radical through an alkylene radical of at least two carbon atoms. Such keto compounds are readily available and are highly stable both under acid conditions and at elevated temperature whether in the form of the carboxylic acid or the ester. Levulinic acid is a preferred example and, since this compound is readily available, it or its alkyl esters is employed in the exemplary but non-limitative formulas and procedures hereinbelow set forth.

Preparation of γ,γ-bis(4-hydroxyphenyl)valeric acid

|  | Grams |
|---|---|
| Phenol (0.2 mol) | 18.8 |
| Levulinic acid (0.05 mol) | 5.8 |
| Calcium chloride | 7.0 |
| Conc. hydrochloric acid | 0.17 |
| Mercaptoacetic acid | 0.06 |

The phenol was dissolved in the levulinic acid to which was added the calcium chloride, hydrochloric acid and mercaptoacetic acid. Solution was hastened by slight warming. After ten days at room temperature, the viscous reaction mixture was poured into water, dissolved in ether and extracted with dilute aqueous sodium bicarbonate. Acidification of the combined bicarbonate extracts yielded a viscous water insoluble resin. This was dissolved in ether; some ethanol and benzene were added; and the solution was evaporated to dryness in a current of air, with heating. The pale amber solid resinous product was identified as γ,γ-bis(4-hydroxyphenyl)valeric acid having the following formula:

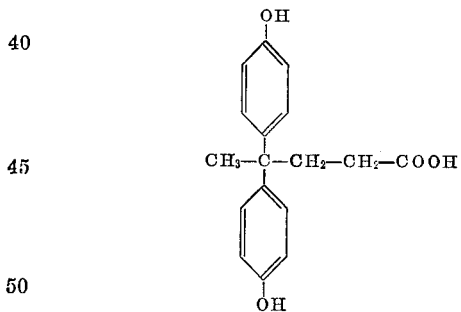

*Analysis.*—Calculated for $C_{17}H_{18}O_4$: C, 71.3; H, 6.3. Found: C, 71.1; H, 6.4.

The glassy form of this compound melts under 100° C., but, from solution, crystalline forms can be obtained either with solvent of crystallization or without, the solvated forms usually being obtained at room temperature. The solvated forms, when heated rapidly melted considerably lower than the anhydrous form which melted at 173°–174° C. By slow cautious heating of the solvated forms, it was often possible to drive off the solvent at a lower temperature without concurrent melting. Crystals deposited from solution in a mixed solvent such as ethyl acetate-carbon tetrachloride often exhibited two unsharp melting points, each followed by resolidification.

It should be noted that a considerable excess of phenol was used, mostly because of the favorable effect on the reaction and the ease with which phenol can be removed from the condensation product. However, it is unnecessary that the phenol be present in excess; and, in fact, an excess of the levulinic acid could be used, if preferred.

Considerable latitude is permissible in the composition of the mixture from which γ,γ-bis(hydroxyphenyl)valeric acid is obtained, both as to choice of reactive agents and as to amounts.

The condensation of phenols with levulinic acid to give the gamma,gamma-bisphenolic substituted valeric acids of this invention was also carried out using as catalyst aqueous hydrochloric acid of concentrations varying from 37% (ordinary concentrated hydrochloric acid) down to about 8%. In these instances the quantities of concentrated hydrochloric acid used in the reaction mixture approximated the weight of levulinic acid used, and the reactions were run as reflux temperature (about 93°–108° C.) for 20–24 hour periods.

Alternatively, sulfuric acid catalyst (of 80% or lower concentration) was also employed at room temperature. Shorter reaction times are often possible with sulfuric acid, but hydrochloric acid is more conveniently removed after completion of the reaction.

Preparation of γ,γ-bis(4-hydroxy-3-methylphenyl)-valeric acid

To freshly distilled o-cresol (216.3 grams) was added 58 grams levulinic acid and 2 grams mercaptoacetic acid. The solution was stirred and saturated with dry hydrochloric acid intermittently for two days and allowed to stand at room temperature for a total of seven days. Unreacted starting materials, water and the hydrochloric acid were distilled off under vacuum up to 150° C. at 2 mm. Hg. A residue weighing about 136 grams remained. To the hot residue was added, with stirring, about 100 ml. of xylene and 30 ml. of ethyl acetate. A fine mush separated as the mixture cooled. A first crop of 61 grams of pale powdery product (M.P. 143°–145° C.) was collected on a filter (washed with xylene-ethyl acetate, 20:6 by volume). The filtrate was extracted with aqueous sodium bicarbonate and from this extract an additional 47 grams of product was recovered. A sample, recrystallized from methanol-water and dried to 130° C. in a vacuum, was analyzed and found to be γ,γ-bis(4-hydroxy-3-methylphenyl)valeric acid. The melting point of the sample was 144°–146° C.

*Analysis.*—Calculated for $C_{19}H_{22}O_4$: C, 72.6; H, 7.0. Found: C, 72.4; H, 7.1.

This compound also readily forms lower melting crystals with solvent of crystallization.

Mercaptoacetic acid is one of a number of sulfur compounds which may be utilized to speed up the reaction of a phenol with the oxocarboxylic acids. Other compounds with which it may be replaced include hydrogen sulfide and mercaptopropionic acid. In fact, the reaction will proceed without the use of auxiliary catalysts but at a slower rate.

Preparation of ethyl ester of γ,γ-bis(4-hydroxyphenyl)-valeric acid

A solution of ethyl levulinate (36.05 grams), phenol (94 grams) and mercaptoacetic acid (5 drops) in absolute ethanol (46 grams) was saturated with dry hydrochloric acid. After this had stood about 36 hours at room temperature, a 7.5-gram sample was withdrawn and distilled under vacuum up to a bath temperature of 150° C. at 0.3 mm. Hg. The solid residue was dissolved in ethanol. Some water was added and the solvent slowly evaporated from the solution. The ethyl ester of γ,γ-bis(4-hydroxyphenyl)valeric acid crystallized in stubby colorless prisms (M.P. 126°–128° C.). Similar treatment of the balance of the reaction mixture several days after resaturating with dry hydrochloric acid gave a total yield of 30 grams more of the ethyl ester. Another sample was crystallized from ethyl acetate-petroleum ether and melted at 127.5°–128.5° C.

*Analysis.*—Calculated for $C_{19}H_{22}O_4$: C, 72.6; H, 7.0. Found: C, 72.4; H, 7.1.

The esters of these bisphenolic substituted derivatives of valeric acid may either be prepared directly from the levulinic ester as described above, or the condensation product of the phenol and levulinic acid may be subsequently esterified as illustrated by the following.

Preparation of methyl ester of γ,γ-bis(4-hydroxyphenyl)-valeric acid

A solution of 20 grams of γ,γ-bis(4-hydroxyphenyl)-valeric acid in 50 ml. of methanol and 1 ml. concentrated sulfuric acid was reflux for 3 hours and 15 minutes. Most of the methanol was removed under vacuum. The crude product residue was dissolved in ether, washed with dilute aqueous sodium bicarbonate, then washed with water, and dried over anhydrous magnesium sulfate. Evaporation of the solvent left 17 grams of resin. A sample, crystallized from solution in ethyl acetate-carbon tetrachloride, melted at about 85° C. with evolution of solvent of crystallization. Another solvated form was obtained from a methanol-water solution and melted unsharply at about 85° C. A sample of the ester, recrystallized after evaporative distillation at 220–230° at 0.5 mm. Hg, was dried slowly under vacuum up to 95° C. until rid of solvent. Its melting point was found to be 130°–132° C.

*Analysis.*—Calculated for $C_{18}H_{20}O_4$: C, 72.0; H, 6.7. Found: C, 71.6; H, 6.8.

Preparation of γ,γ-bis(3,5-diisopropyl-4-hydroxyphenyl)-valeric acid

To 62.5 grams (0.35 mols) of 2,6-diisopropylphenol and 23 grams (0.2 mols) of levulinic acid in a round bottomed flask was added 0.5 gram of mercaptoacetic acid and enough dry hydrochloric acid to saturate the solution. The charge was allowed to stand at room temperature for about six days, during which time it was resaturated with dry hydrochloric acid about once a day. A 4.5-gram sample was withdrawn and distilled up to 150° C. at 1 mm. Hg, yielding a residue of 0.6 gram of the desired product. After an additional week the product began to precipitate from the main reaction mixture in the form of fine silky needles. A first crop of 17- gram product was collected on a filter. This could be recrystallized from methanol-water, from ethylacetate-petroleum ether or from heptane. The colorless crystals melted at 131°–132.5° C.

*Analysis.*—Calculated for $C_{29}H_{46}O_4$: C, 76.7; H, 9.3. Found: C, 76.6; H, 9.3.

The same compound was obtained in shorter time, also at room temperature, using 80% sulfuric acid as catalyst and a trace of stearylamine as emulsifier.

A number of other phenols including 2,6-dimethylphenol, 2,6-diethylphenol, and o-phenylphenol have been found to react with the described oxoacids to give bisphenolic acids. Ortho-chlorophenol and 2,6-di-t-butylphenol are found to react, but with more difficulty.

The bisphenolic acids and products obtained therefrom may be utilized in a variety of ways such as for antioxidants, germicides and fungicides, agricultural chemicals (growth regulators), plasticizers, lubricants, low adhesion backsizes, coupling agents, casting and molding resins and as intermediates in the production of polyfunctional epoxy compounds and internally plasticized phenol-aldehyde resins. The compounds of this invention are also valuable intermediate for the preparation of paper and textile treating materials. The initial condensates with formaldehyde as well as derivatives of the carboxyl function provide points of attachment to the fiber. Halogenation and nitration of products of this invention may be carried out to enhance certain types of activity such as fungicidal, bactericidal, and hebicidal functions.

A polymer which exhibits low adhesion properties toward a pressure-sensitive adhesive was prepared by esterifying the product acid of γ,γ-bis(4-hydroxyphenyl)valeric acid with a long chain alcohol (stearyl alcohol) in the presence of a small amount of xylene as a water carrier. The reaction mixture was heated slowly to 170° C. bath temperature over a period of 5 hours. Volatile matter was distilled off to 150° C. at 1 mm. Hg presure. The amber waxy product was converted to an insoluble resin by reacting it in acetic acid solution with an excess of aqueous formaldehyde using a trace of hydrochloric acid as a catalyst. The solution was warmed to reflux, then evaporated at elevated temperature to give a hard, insoluble resin having low adhesion properties.

Example 1

A highly insoluble polyamide which may be cross-linked to an infusible polymer was prepared by reacting γ,γ-bis (4-hydroxyphenyl)valeric acid with an equivalent amount of polyethylenimine at an elevated temperature. A small amount of xylene was added to aid reaction by removal of water. After 5 to 6 hours at the reflux temperature, a light amber resinous polyamide was obtained. Subsequent reaction with formaldehyde may be carried out to cross-link this polymer.

Example 2

γ,γ-bis(4-hydroxy-3-methylphenyl)valeric acid was reacted with butanediol to obtain a tetraphenolic diester compound which became a hard, infusible, insoluble resin by the action of an aqueous formaldehyde solution in an acidic medium.

A variety of other polyfunctional compounds are also suitable for reaction with the carboxylic acid radical of the bisphenolic acids of this invention to produce cross-linkable resins including other diols such as ethylene glycol, diamines such as 1,3-diaminobutane, and amino alcohols such as N-butylethanolamine.

An especially interesting result is obtained by the action of glycols and polyglycols on the bisphenolic substituted carboxylic acids.

Example 3

γ,γ-bis(4-hydroxyphenyl)valeric acid was esterified with a block copolymer of polyethylene oxide and polypropylene oxide having an average molecular weight of about 2400, which diol may be represented by the formula

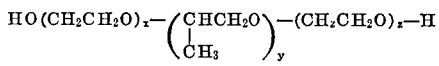

in which x and z are integeres equal to 1 or more and y is an integer greater than 1. The diester was cross-linked to a cheesy gel under the action of formaldehyde, as opposed to the hard resin obtained when 1,4-butylene glycol was substituted for the high molecular weight diol. It will be appreciated that resins varying widely in hardness and flexibility are obtainable by proper selection of the diol.

Example 4

The bisphenolic acids bearing a reactive hydrogen ortho to the phenolic hydroxyl have been found to be useful intermediate in the preparation of photo-sensitive compounds, particularly for use on lithoplates. Thus, γ,γ-bis (4-hydroxyphenyl)valeric acid was esterified with glycerol to give a product corresponding to a mixture of the mono- and diesters. This was nitrosated, reduced to amine, and then diazotized. The diazonium salt was light sensitive and gave a developable image when coated on a properly cleaned aluminum sheet and exposed through a transparency to an arc lamp light source (see applicant's U.S. Patent No. 3,169,864).

Example 5

A particularly useful application of the bisphenolic acids is in the synthesis of a new class of epoxy resins of improved properties. For example, γ,γ-bis(4-hydroxyphenyl)valeric acid was reacted with N-butylethanolamine to give the amide-ester which in turn was condensed with epichlorhydrin in the presence of excess aqueous alkali.

The purified product was isolated as a somewhat soft resin which contained 6.2% oxirane oxygen by analysis. This was readily cured at an elevated temperature by a variety of curing agents effectively used with epoxy compounds to give a hard polymer having a high heat distortion point.

An analogous epoxy derivative was prepared similarly from γ,γ-bis(4-hydroxy-3-methylphenyl)valeric acid.

A number of other reactions are possible with the bisphenolic acids and derivatives thereof to produce a wide variety of novel and useful products. For example, one mol of a dihalogenated compound such as β,β'-dichlorodiethyl ether may be condensed in the presence of excess aqueous alkali with two mols of a bisphenolic substituted carboxylic acid to give a product typified by the following formula, as one example:

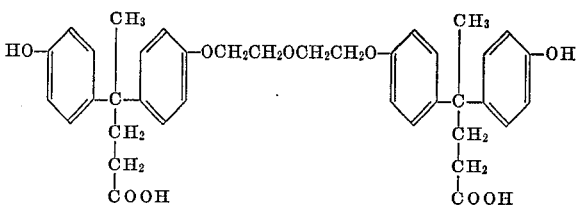

This dicarboxylic acid may be reacted with diols, diamines, diisocyanates, or aminoalcohols to give linear polymers having side group substituents at intervals. Controlled cross-linking can be carried out through the reactive phenolic side group and formaldehyde. This dicarboxylic acid and products obtained therefrom offer considerable promise as plasticizers, antioxidants, and lubricants and may prove to combine two or more of these properties into a single compound. A higher ratio of dihaloether to bisphenolic acid would give polymers directly.

It should also be noted that the aromatic rings of the bisphenolic acids and compounds obtainable therefrom may be reduced catalytically to give the cycloaliphatic analogs thereof.

What is claimed is:

1. The polyesters or amide-ester reaction product of exclusively (1) a saturated aliphatic compound selected from the group consisting of diols, triols and alkanolamines having at least two functional groups selected only from amino and hydroxyl, and (2) gamma,gamma-bis(4-hydroxyphenyl)valeric acid.

2. The reaction product as defined in claim 1 wherein said organic compound was a dihydric or trihydric alcohol.

3. The polyamide, polyester or amide-ester reaction product of exclusively (1) polyethylenimine or a saturated aliphatic compound selected from the group consisting of diols, triols, and alkanolamines having at least two functional groups selected only from amino and hydroxyl, and (2) bisphenolic acid of the formula

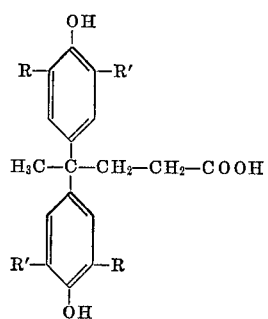

wherein R and R' are each selected from the group consisting of hydrogen and lower alkyl radicals.

4. The reaction product defined in claim 3 wherein said saturated aliphatic compound was a dihydric or trihydric alcohol.

5. The reaction product defined in claim 4 wherein said dihydric alcohol was a block copolymer of polyethylene oxide and polypropylene oxide.

6. The reaction product defined in claim 3 wherein said saturated aliphatic compound was an alkanolamine.

7. The reaction product defined in claim 6 wherein said alkanolamine was N-butylethanolamine.

8. The polyamide reaction product of (1) polyethylenimine and (2) gamma,gamma-bis(4-hydroxyphenyl) valeric acid.

9. The resinous polymeric condensation product of formaldehyde and the reaction product defined in claim 3.

References Cited

UNITED STATES PATENTS

| 2,907,738 | 10/1959 | Greenlee | 260—24 |
| 2,907,743 | 10/1959 | Greenlee | 260—47 |
| 2,933,520 | 4/1960 | Bader | 260—473 |

H. D. ANDERSON, *Primary Examiner.*

HOWARD SCHAIN, *Assistant Examiner.*

U.S. Cl. X.R.

96—33, 75, 91; 252—401, 404; 260—31.4, 31.6, 51, 51.5, 52, 61, 559, 823, 838, 141